United States Patent
Wyker

(10) Patent No.: US 7,360,698 B1
(45) Date of Patent: Apr. 22, 2008

(54) METHOD FOR DETERMINING RELEVANCE TO CUSTOMERS OF AN ADVERTISEMENT FOR RETAIL GROCERY ITEMS OFFERED BY A RETAILER

(76) Inventor: Kenneth S. Wyker, 6202 Glencairn Ct., Charlotte, NC (US) 28269

( * ) Notice: Subject to any disclaimer, the term of this patent is extended or adjusted under 35 U.S.C. 154(b) by 332 days.

(21) Appl. No.: 11/046,376

(22) Filed: Jan. 28, 2005

Related U.S. Application Data

(60) Provisional application No. 60/539,876, filed on Jan. 28, 2004.

(51) Int. Cl.
*G06K 15/00* (2006.01)
(52) U.S. Cl. .......................... 235/383; 235/381
(58) Field of Classification Search ............... 235/383, 235/381; 705/1, 26, 37
See application file for complete search history.

(56) References Cited

U.S. PATENT DOCUMENTS

| | | | |
|---|---|---|---|
| 6,266,649 B1 * | 7/2001 | Linden et al. | 705/26 |
| 6,512,919 B2 * | 1/2003 | Ogasawara | 455/422.1 |
| 6,912,505 B2 * | 6/2005 | Linden et al. | 705/14 |
| 7,063,263 B2 * | 6/2006 | Swartz et al. | 235/472.02 |
| 7,107,221 B1 * | 9/2006 | Tracy et al. | 705/1 |
| 7,113,917 B2 * | 9/2006 | Jacobi et al. | 705/14 |
| 2003/0105682 A1 * | 6/2003 | Dicker et al. | 705/27 |
| 2003/0212619 A1 * | 11/2003 | Jain et al. | 705/35 |
| 2004/0230440 A1 * | 11/2004 | Malhotra | 705/1 |
| 2006/0195362 A1 * | 8/2006 | Jacobi et al. | 705/14 |

\* cited by examiner

*Primary Examiner*—Ahshik Kim
(74) *Attorney, Agent, or Firm*—Schwartz Law Firm P.C.

(57) ABSTRACT

A method for determining relevance to customers of an advertisement for retail grocery items offered by a retailer. The method includes the steps of, for each item contained in the advertisement, creating an item promo group including non-ad items related to the advertised item. All items of the promo groups are then compared to a customer's purchase history data. The relevance of the advertised items is then quantified based on prior purchases by the customer of items contained in the corresponding promo groups.

20 Claims, 2 Drawing Sheets

METHOD FOR DETERMINING RELEVANCE TO CUSTOMERS OF AN ADVERTISEMENT FOR RETAIL GROCERY ITEMS OFFERED BY A RETAILER

This application claims the benefit of a provisional application Ser. No. 60/539,876 filed on Jan. 28, 2004. This invention relates generally to the retail grocery industry, and more specifically, to a method for determining relevance to customers of an advertisement for retail grocery items offered by a retailer. The invention quantifies the relevance of the advertisement from the customer's perspective, and allows meaningful analysis of a retailer's marketing efforts to its targeted customer base. The invention further offers added value to customers by presenting only those advertised items which are relevant to the particular customer, and in a strategic listing designed to maximize the overall impact of the advertisement.

TECHNICAL FIELD AND BACKGROUND OF THE INVENTION

Retailers recognize the value of targeting offers to specific customers. Through the use of frequent shopper cards, many retailers are collecting and recording the purchase activity of their customers. However, it has proven difficult for retailers to effectively leverage their data to deliver meaningful incentives to their customers.

A major challenge that retailers face is the overwhelming amount of purchase data and the large number of items purchased. A common method of leveraging frequent shopper data is to establish an incentive and then deliver the incentive to customers that "qualify" for the offer based on specified purchase criteria. For example, a coupon for savings on a particular brand of peanut butter might be targeted to all customers purchasing peanut butter in the last year, but never purchasing that particular brand. This type of process works by segmenting or clustering customers based on the qualification criteria, but does not achieve true personalization of the offers.

True personalization can be achieved by having a collection of multiple offers with the optimal offers selected to be presented to each customer. Each offer or incentive can be measured or scored, with the best offers being selected for each customer. In one application of the invention, the offer set is the existing promotional specials contained in a retailer's weekly ad. By using existing ad specials, there is no need for the retailer or manufacturers to come up with incremental promotional dollars to fund the customer incentive.

What makes the invention especially powerful is that it uses a "consumer-centric" evaluation method to determine which offers should be presented to each customer. This consumer-centric evaluation quantifies the relevance of each ad item for each customer, such that personalized ads to customers achieve maximum results.

Relevance—Promo Groups

Certain existing programs claim to target customers "based on their prior purchase history." In practice, however, all that is done is to determine if the customer shops within the category or has purchased a particular item. This segmentation or clustering method can determine which offers should be presented to a customer (which offers they "qualify for"), but it is ineffective at prioritizing among the offers or evaluating the relevance of an advertised item.

The present method uses a unique, consumer-centric approach by designating relevance items (a "promo group") for each feature item contained in the advertisement. The promo group is a collection of items including one or more non-ad items that, if purchased, indicate an interest in the feature ad item. These promo groups are created based on an understanding of the customers' uses of an item, and therefore cannot be created using standard category and brand definitions.

A key added benefit of the invention is that it removes a major logistical issue related to creating personalized ads. In the present system, retailers do not need to provide their ad data files (price files) every week. It also allows for more lead time since the ad layouts (for the print versions) are finalized at least 2 weeks prior to the ad drop. The ad pricing files are sometimes modified much closer to the actual ad run date.

The invention also allows a direct comparison with competitor ads because the same printed ad visuals can be evaluated for the competitor. If the pricing file is used, there is no way to collect similar data for competitor's ads. By creating promo groups according to the present invention, it is possible to establish a standardized measure of the value of any ad against any customer group. Outside of the present invention, there are currently no methods employed in the industry to score or measure the value of an ad in a standardized and consumer-centric way.

SUMMARY OF INVENTION

Therefore, it is an object of the invention to provide a method for measuring the value of an advertisement for retail grocery items in a standardized and consumer-centric way.

It is another object of the invention to utilize a consumer-centric evaluation method to determine which ad offers should be presented to each customer.

It is another object of the invention to provide a method which quantifies the relevance of each ad item, such that personalized ads to customers achieve maximum results.

It is another object of the invention to provide a method which displays a personalized ad to the customer with ad items ranked in order of their relevance to the particular customer.

It is another object of the invention to provide a method which utilizes a mathematical algorithm to score any advertisement based on its relevancy to a particular retailer's customer base.

It is another object of the invention to provide a method which generates a numerical power index for a single item contained in the ad, a group of items contained in the ad, and/or the entire ad itself.

It is another object of the invention to promote customer loyalty to the retail store.

It is another object of the invention to provide a method for personalizing ads to customers which does not require access to the retailer's ad data file (price file).

It is another object of the invention to provide a method which allows meaningful analysis of a retailer's marketing efforts to its targeted customer base.

It is another object of the invention to provide a method which may be used to evaluate a competitor's ad relative to its own customer base.

It is another object of the invention to provide a method which allows direct comparison of one ad week to any other ad week.

It is another object of the invention to provide method which may also be used to target/prioritize manufacturer coupon offers to customers.

These and other objects of the present invention are achieved in the preferred embodiments disclosed below by providing a method for determining relevance to customers of an advertisement for retail grocery items offered by a retailer. The method includes the steps of, for each item contained in the advertisement, creating an item promo group including non-ad items related to the advertised item. All items of the promo groups are then compared to a customer's purchase history data. The relevance of the advertised items is then quantified based on prior purchases by the customer of items contained in the corresponding promo groups.

"Related items" may include, for example, any non-ad item that is identical to the advertised item, but packaged in a different manner, size, or quantity; non-ad items of a different flavor, such as plain, barbeque, and sour cream-and-onion potato chips; non-ad items with added features, such as broccoli & broccoli with cheese; non-ad items in the same food category, such as oranges & tangerines; and any non-ad item that compliments the advertised item, such as chips & dip or spaghetti & spaghetti sauce.

According to another preferred embodiment of the invention, the step of quantifying the relevance of the advertised items includes utilizing a mathematical algorithm to obtain a numerical relevance indicator.

According to another preferred embodiment of the invention, the method includes generating a power index for each item contained in the advertisement. The power index reflects a degree of relevance of each item to a customer base of the retailer.

According to another preferred embodiment of the invention, the method includes generating a power index for a selected group of items contained in the advertisement. The power index reflects a degree of relevance of the selected group to a customer base of the retailer.

According to another preferred embodiment of the invention, the method includes generating a power index for the entire advertisement. The power index reflects a degree of relevance of the advertisement to a customer base of the retailer.

According to another preferred embodiment of the invention, after quantifying the relevance of the advertised items, the method includes displaying the advertised items to the customer in a list.

According to another preferred embodiment of the invention, the method includes ranking the items in the list in descending order of relevance to the customer.

According to another preferred embodiment of the invention, the method includes manipulating the list order of advertised items displayed to the customer based on weighting factors typically established by the retailer.

According to another preferred embodiment of the invention, after quantifying the relevance of the advertised items, the method includes displaying the advertised items to the customer via electronic mail.

According to another preferred embodiment of the invention, after quantifying the relevance of the advertised items, the method includes displaying the advertised items to the customer via an Internet website.

According to another preferred embodiment of the invention, after quantifying the relevance of the advertised items, the method includes displaying the advertised items to the customer via an in-store or remote kiosk.

According to another preferred embodiment of the invention, the step of creating promo groups includes entering into an electronic database a unique code for each item contained within each promo group.

According to another preferred embodiment of the invention, the step of comparing includes electronically matching the codes of items contained within the promo groups to codes of items previously purchased by the customer.

According to another preferred embodiment of the invention, the step of quantifying the relevance of the advertised items is performed before the advertisement is published.

According to another preferred embodiment of the invention, each promo group includes identical non-ad items packaged in quantities different from that of the advertised item.

In another embodiment, the invention is a system for determining relevance to customers of an advertisement for retail grocery items offered by a retailer. The system includes a plurality of item promo groups. Each promo group includes respective codes identifying non-ad items related to a corresponding advertised item. An electronic database contains purchase history data of the customer. Means are provided for electronically comparing the code of the promo groups to the purchase history data. Further means are provided for quantifying the relevance of the advertised items based on prior customer purchases of items contained in the corresponding promo groups.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
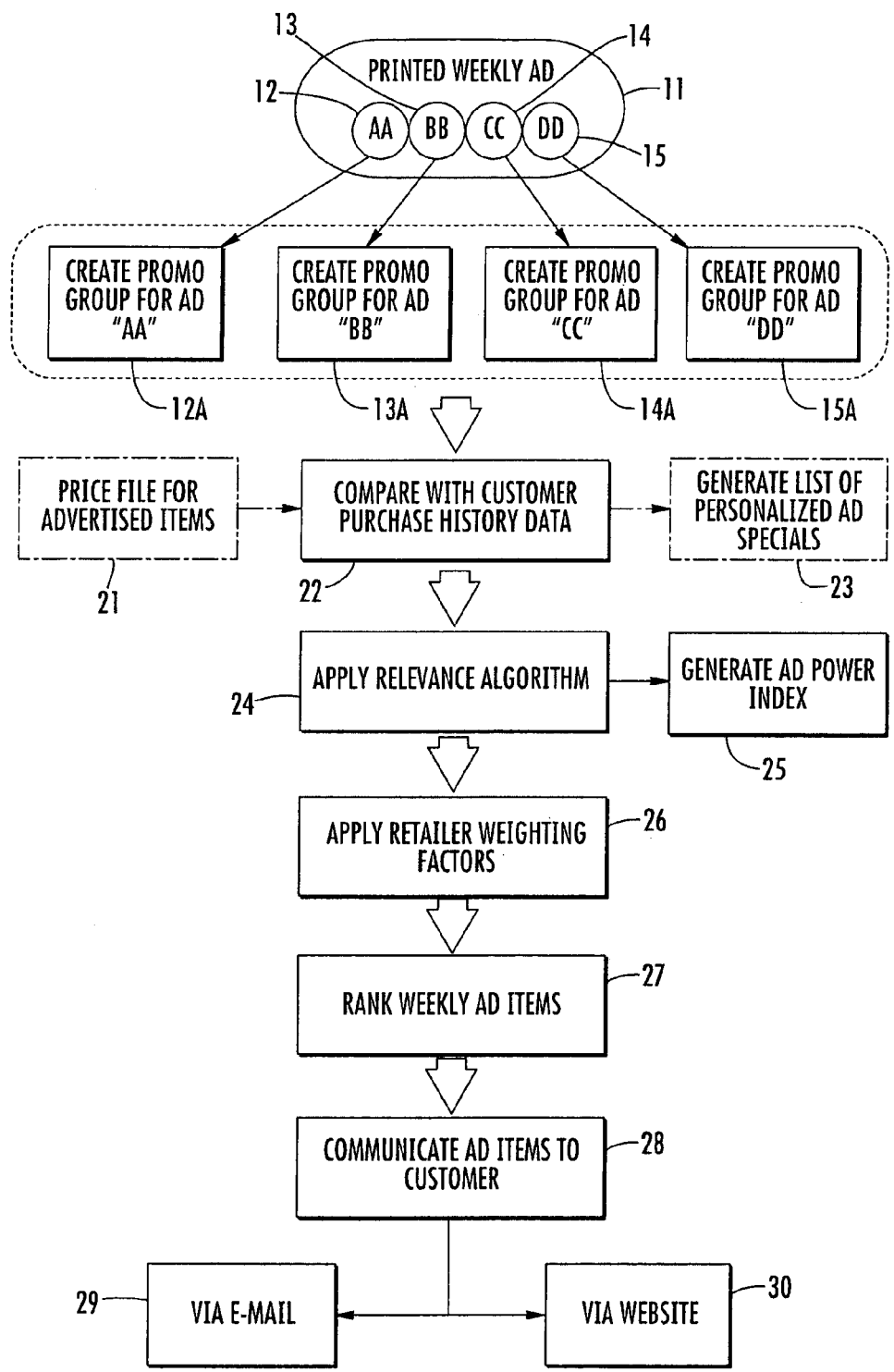
FIG. 1 is a flow diagram illustrating a method of the present invention according to one preferred embodiment.

Referring now specifically to the drawings, a method according to the present invention is illustrated in the flow diagram of FIG. 1. The method serves to determine relevance to customers of an advertisement for retail grocery items offered by a retailer. The method yields valuable marketing data relating to the retailer's customer base, and promotes customer loyalty through the communication of personalized and highly relevant ad specials.

As indicated in FIG. 1, the present method utilizes the retailer's existing printed "Weekly Ad", indicated at 11, containing advertised items 12, 13, 14, and 15, and creates promo groups 12A, 13A, 14A, and 15A (sets of UPC's) for the corresponding advertised items 12, 13, 14, and 15. The promo groups 12A-15A include related non-ad items that, when compared against a customer's purchase history, indicate a degree of relevance to the customer of the respective corresponding items 12-15 featured in the ad 11. For example, if the ad 11 shows DiGiorno® 12-inch pizza, the promo group may include the ad item and related non-ad items such as DiGiorno® 8-inch pizza varieties, and DiGiorno® deep dish or stuffed crust pizzas.

The boxes 21, 22, and 23 of the flow diagram illustrate a common, prior art approach to ad personalization. Traditionally, the first step in this process is to obtain the retailer's Price File containing UPC's of all featured items "on deal." The Price File UPC's are then compared against the UPC-level customer purchase history to create a listing of featured ad items that the customer has previously purchased.

The present method deviates from this standard approach by expanding the measure of relevance—i.e., removing the limitations of exactness in the prior art's precise UPC comparison. The promo groups 12A-15A (relevance lists) are created entirely from the printed advertisement 11, and without regard to the retailer's Price File. Promo groups 12A-15A are formed based on the way customers actually see the printed ad 11. This method translates the printed ad 11 into a format that can be compared (at box 22) in a more meaningful way to the purchase history of each customer.

Figure 2:
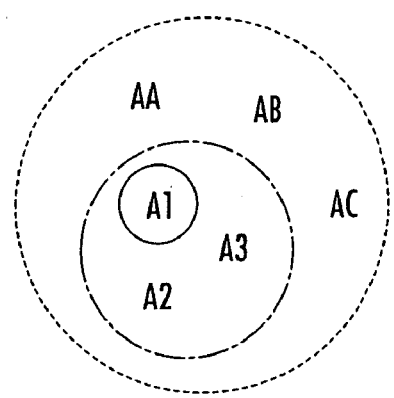
FIGS. 2, 3, and 4 are Venn diagrams demonstrating application of the promo groups in the present method.
Figure 3:
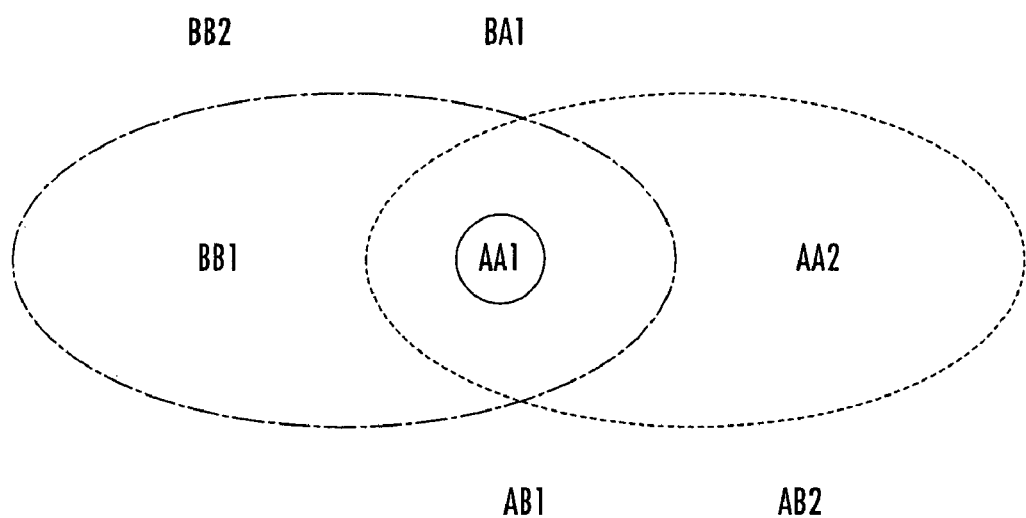
Figure 4:
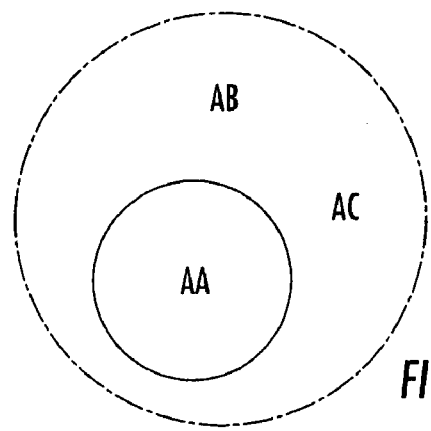

The advantages of the present consumer-centric method over the traditional prior art approach are illustrated in the Venn diagrams of FIGS. 2, 3, and 4.

In the example of FIG. 2, Fritos® 10-oz Regular (indicated at A1 in the diagram) is featured in the printed advertisement. Although not featured in the ad, other related items including Fritos® 10-oz Scoops (A2) and Fritos® 10-oz Barbeque (A3) are also on-deal at the retail store. In a traditional program, if any of these items matches the customer purchase history data, then the feature item is presented to the customer in his/her "personalized" ad. The present method expands the measure of relevance by creating a promo group including other related non-ad items—namely, Fritos® 1.5-oz Regular (AA), Fritos® 1.5-oz Barbeque (AB), and Fritos® Tray Pack (AC). In this case, if any ad items or non-ad items in the promo group match the customer's purchase history data, then the feature item is presented to the customer in the personalized ad.

In FIG. 3, the printed advertisement features Bud Light® 12-pack bottles (AA1). Budweiser® 12-pack bottles (BB1) is also on-deal at the retail store, although not featured in the ad. The promo group in this case includes related Bud Light® bottled items, such as Bud Light® 6-pack bottles (M2), but excludes Bud Light® 12-pack cans (AB1) and Bud Light® 6-pack cans (AB2), and Budweiser® items, such as Budweiser® 6-pack bottles (BB2) and Budweiser® 12-pack cans (BA1). This scenario demonstrates an improvement in the measure of relevance of the featured ad items, as items that are also on-deal but not featured in the ad would not be included in the promo group.

In FIG. 4, the printed advertisement features Cherry Pie (AA). The retail store also has Apple Pie (AB) and Pumpkin Pie (AC) on-deal. The promo group in this case includes only Cherry Pie (AA), since that is the only item communicated in the printed ad. This scenario also demonstrates an improved measure of relevance. From a consumer-centric perspective, the ad featuring Cherry Pie (AA) would not likely appeal to a customer that buys Apple Pies (AB) and/or Pumpkin Pies (AC). In this case, the present method reveals a situation where the retailer is unintentionally limiting the relevance of its ad.

Relevance Algorithm

After creating the promo groups 12A-15A, as discussed above, a mathematical algorithm (box 24) is used to obtain a numerical relevance indicator for each ad item 12-15 against every customer. This "relevance algorithm" integrates certain purchase history details of non-ad items contained in the promo groups 12A-15A to measure the customer's interest in the corresponding ad item 12-15. The core function of the algorithm is to quantify the relevance of a particular ad item 12-15 in a standardized way. This standardization enables direct comparison and prioritization of multiple features. The algorithm utilizes a variety of measures/factors to generate a comprehensive assessment of the relevance of each item 12-15 to the customer.

The following example illustrates one application of the present algorithm. In this example, the following variables were used:

A=greatest visit count # for any one purchased item contained in the promo group B=sum of net sales for all purchased items contained in the promo group C=number of purchased items contained in the promo group D=sum of units for all purchased items contained in the promo group (Note that B/D is average unit price for all items contained in a promo group)

$$\text{Algorithm/Rating} = (A + (0.2*B)) + (A*(B/D))/(C*0.7)$$

Example

A promo group called FRESH BROCCOLI contains the following three (3) items:

| Item Number | Item Name |
|---|---|
| 1 | Bunch Broccoli |
| 2 | Organic Broccoli |
| 3 | Broccoli Crowns |

The customer has the following purchase history:

| Item Number | Item Name | Visit Count | Units Purch. | Net Sales |
|---|---|---|---|---|
| 1 | Bunch Broccoli | 5 | 8 | 16.00 |
| 3 | Broccoli Crowns | 7 | 7 | 21.00 |

In this example:

A=7

B=37.00

C=2

D=15

$$\text{Algorithm/Rating} = (7 + (0.2*37)) + (7*(37/15))/(2*0.7)$$

which equals, 26.73

Ad Power Index

The standardized measures generated by the relevance algorithm are used to create an Ad Power Index, as indicated at box 25. The Power Index scores the entire ad 11 (or selected portions thereof) based on the cumulative relevance to the retailer's customer base. This process is built on the mathematical algorithm of customer relevance and produces a numerical measure of overall impact. The Power Index allows a retailer to compare one ad week to any other, as well as its own ad against a competitor's ad.

The Power Index is particularly applicable in ad planning and development. The Power Index can be generated either before or after publication of the printed ad 11, and can be used to establish targets for each ad's customer relevance, either against the entire customer base or against a particular segment of customers. The results and measures can be generated by category or department to enable an overall evaluation of the various offerings 12-15 within the ad 11. By generating the Power Index before the ad 11 is completed and published, retailers are given a unique opportunity to address any issues that the evaluation might reveal.

The Power Index is also useful in competitive tracking. The Power Index can measure the power of a competitor's ad from the perspective of the retailer's own customer base. In other words, a retailer can identify what elements of the competitor's ad are most compelling to their customers. With this knowledge, the retailer can match the relevance of the competitor with its own ads. The results can also be used to identify which of the retailer's customers are most vulnerable to the competitor's ad. These customers can be strategically targeted with the knowledge and understanding of the retailer's relative weaknesses.

Standardization vs. Modification

As previously discussed, the present algorithm measures customer relevance in a standardized way. In many ads, however, retailers prefer to give display priority to certain items regardless of their relevance scores. These "priority" items might include, for example, high margin items, items that are popular with specific customer groups (e.g., families with kids), items that drive purchases of complementary items, or items that strengthen the retailer's positioning/price perception. As indicated at box 26, the present system enables prioritization of each offer through weighting factors established by the retailer to modify each item's standardized result, thereby affecting the item's ranking amongst all ad items. In the algorithm example above, if the retailer weighting factor is 150%, then the calculation (1.50*26.73) is increased to 41.00. Priority ranking is important, since only a limited number of ad items 12-15 can be effectively communicated in an email or via an Internet website. The final ad item rankings are determined after application of the weighting factors, as indicated at 27.

Based on the final rankings, a personalized listing of ad items is generated and displayed to the customer, as indicated at 28. The ad items are communicated via e-mail (29) and/or through secure access to a system website (30).

A system and method for determining relevance to customers of an advertisement for retail grocery items offered by a retailer is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. A method for determining relevance to customers of an advertisement for retail grocery items offered by a retailer, said method comprising:
   (a) for each item contained in the advertisement, creating an item promo group including non-ad items related to the advertised item;
   (b) comparing all items of the promo groups to a customer's purchase history data;
   (c) quantifying the relevance of the advertised items based on prior purchases by the customer of items contained in the corresponding promo groups; and
   (d) after quantifying the relevance of the advertised items, presenting the advertised items to the customer.

2. A method according to claim 1, wherein the step of quantifying the relevance of the advertised items comprises utilizing a mathematical algorithm to obtain a numerical relevance indicator.

3. A method according to claim 1, and comprising generating a power index for each item contained in the advertisement, the power index reflecting a degree of relevance of each item to a customer base of the retailer.

4. A method according to claim 1, and comprising generating a power index for a selected group of items contained in the advertisement, the power index reflecting a degree of relevance of the selected group to a customer base of the retailer.

5. A method according to claim 1, and comprising generating a power index for the entire advertisement, the power index reflecting a degree of relevance of the advertisement to a customer base of the retailer.

6. A method according to claim 1, and comprising after quantifying the relevance of the advertised items, displaying the advertised items to the customer in a list.

7. A method according to claim 6, ranking the items in the list in descending order of relevance to the customer.

8. A method according to claim 6, and comprising manipulating the list order of advertised items displayed to the customer based on weighting factors.

9. A method according to claim 1, and comprising after quantifying the relevance of the advertised items, displaying the advertised items to the customer via electronic mail.

10. A method according to claim 1, and comprising after quantifying the relevance of the advertised items, displaying the advertised items to the customer via an Internet website.

11. A method according to claim 1, wherein the step of creating promo groups comprises entering into an electronic database a unique code for each item contained within each promo group.

12. A method according to claim 11, wherein the step of comparing comprises electronically matching the codes of items contained within the promo groups to codes of items previously purchased by the customer.

13. A method according to claim 1, wherein the step of quantifying the relevance of the advertised items is performed before the advertisement is published.

14. A method according to claim 1, wherein each promo group comprises identical non-ad items packaged in quantities different from that of the advertised item.

15. A method for determining relevance to customers of an advertisement for retail grocery items offered by a retailer, said method comprising the steps of:
   (a) for each item contained in the advertisement, creating an item promo group including non-ad items related to the advertised item;
   (b) comparing all items of the promo groups to a customer's purchase history data;
   (c) quantifying the relevance of the advertised items based on prior purchases by the customer of items contained in the corresponding promo groups;
   (d) displaying the advertised items to the customer in a list; and
   (e) applying weighting factors to manipulate the list order of advertised items displayed to the customer.

16. A method according to claim 15, wherein the step of quantifying the relevance of the advertised items comprises utilizing a mathematical algorithm to obtain a numerical relevance indicator.

17. A method according to claim 15, and comprising displaying the advertised items to the customer via electronic mail.

18. A method according to claim 15, and comprising displaying the advertised items to the customer via an Internet website.

19. A method according to claim 15, wherein the step of creating promo groups comprises entering into an electronic database a unique code for each item contained within each promo group.

20. A system for determining relevance to customers of an advertisement for retail grocery items offered by a retailer, said system comprising:
  (a) a plurality of item promo groups, each promo group including respective codes identifying non-ad items related to a corresponding advertised item;
  (b) an electronic database comprising purchase history data of the customer;
  (c) means for electronically comparing the code of said promo groups to said purchase history data;
  (d) means for quantifying the relevance of the advertised items based on prior customer purchases of items contained in the corresponding promo groups; and
  (e) means for displaying the advertised items to the customer.

* * * * *